US008851985B2

(12) United States Patent
Rasmussen et al.

(10) Patent No.: US 8,851,985 B2
(45) Date of Patent: Oct. 7, 2014

(54) MULTI-LAYER WAGERING GAME DISPLAY

(75) Inventors: James M. Rasmussen, Chicago, IL (US); John Burica, Hometown, IL (US); Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 103 days.

(21) Appl. No.: 13/440,086

(22) Filed: Apr. 5, 2012

(65) Prior Publication Data

US 2012/0270648 A1 Oct. 25, 2012

Related U.S. Application Data

(60) Provisional application No. 61/472,256, filed on Apr. 6, 2011.

(51) Int. Cl.
*A63F 13/00* (2014.01)
*G07F 17/32* (2006.01)

(52) U.S. Cl.
CPC .................................. *G07F 17/3211* (2013.01)
USPC ............................................... 463/30; 463/20

(58) Field of Classification Search
CPC ................................................... G07F 17/3211
USPC ......... 463/20, 30; 362/97.1, 601, 613; 349/62
See application file for complete search history.

(56) References Cited

U.S. PATENT DOCUMENTS

| | | | |
|---|---|---|---|
| 6,280,328 | B1 | 8/2001 | Holch et al. |
| 6,517,433 | B2 | 2/2003 | Loose et al. |
| 7,134,079 | B2 | 11/2006 | Brown et al. |
| 7,309,284 | B2 | 12/2007 | Griswold et al. |
| 7,410,419 | B2 | 8/2008 | Fiden |
| 7,452,276 | B2 | 11/2008 | Loose et al. |
| 7,458,890 | B2 | 12/2008 | Loose et al. |
| 7,594,852 | B2 | 9/2009 | Rasmussen |

(Continued)

FOREIGN PATENT DOCUMENTS

| | | |
|---|---|---|
| WO | WO 2006/124976 | 11/2006 |
| WO | WO 2007/089410 | 8/2007 |
| WO | WO 2008/011049 | 1/2008 |

OTHER PUBLICATIONS

"Learn About LCD TV and TFT LCD Displays." AVDEALS.com. Sep. 14, 2009:7 pages. http://www.avdeals.com/classroom/what_is_tft_lcd.htm.

(Continued)

*Primary Examiner* — Damon Pierce
(74) *Attorney, Agent, or Firm* — Nixon Peabody LLP

(57) ABSTRACT

In one aspect, a wagering game system includes a display device including a projector, a rear switchable liquid crystal panel positioned in front of the projector to receive light output from the projector, a front switchable liquid crystal panel positioned in front of the rear switchable liquid crystal panel to receive light output through the rear switchable liquid crystal panel, and a liquid crystal panel assembly disposed in front of the front switchable liquid crystal panel. The front switchable liquid crystal panel and/or the rear switchable liquid crystal panel are configured to provide one or more regions controlled by the controller that may be independently maintained in a different state than other regions of the respective one of the front switchable liquid crystal panel and the rear switchable liquid crystal panel. The projector is configured to output light to the liquid crystal panel through the front switchable liquid crystal panel and the rear switchable liquid crystal panel to provide a backlight for the liquid crystal panel.

20 Claims, 9 Drawing Sheets

(56) References Cited

U.S. PATENT DOCUMENTS

| | | | | |
|---|---|---|---|---|
| 7,654,899 | B2 | 2/2010 | Durham et al. | |
| 2003/0045354 | A1 | 3/2003 | Giobbi | |
| 2003/0087690 | A1 | 5/2003 | Loose et al. | |
| 2004/0029636 | A1 | 2/2004 | Wells | |
| 2004/0198485 | A1 | 10/2004 | Loose et al. | |
| 2004/0219968 | A1 | 11/2004 | Fiden et al. | |
| 2005/0153775 | A1 | 7/2005 | Griswold et al. | |
| 2005/0255908 | A1 | 11/2005 | Wells | |
| 2005/0277460 | A1 * | 12/2005 | Inoue | 463/20 |
| 2007/0004513 | A1 | 1/2007 | Wells et al. | |
| 2008/0004104 | A1 | 1/2008 | Durham et al. | |
| 2008/0020816 | A1 | 1/2008 | Griswold et al. | |
| 2008/0020839 | A1 | 1/2008 | Wells et al. | |
| 2008/0020840 | A1 | 1/2008 | Wells et al. | |
| 2008/0020841 | A1 | 1/2008 | Wells et al. | |
| 2008/0096655 | A1 | 4/2008 | Rasmussen et al. | |
| 2008/0113755 | A1 * | 5/2008 | Rasmussen et al. | 463/20 |
| 2008/0119288 | A1 | 5/2008 | Rasmussen | |
| 2008/0188283 | A1 * | 8/2008 | Okada | 463/20 |
| 2008/0207303 | A1 | 8/2008 | Rasmussen | |
| 2009/0036208 | A1 * | 2/2009 | Pennington et al. | 463/33 |
| 2009/0075721 | A1 | 3/2009 | Pacey et al. | |
| 2009/0131145 | A1 | 5/2009 | Aoki et al. | |

OTHER PUBLICATIONS

"Liquid Crystal Display." Wikipedia.org. Sep. 14, 2009: 16 pages. <http://en.wikipedia.org/wiki/Liquid_crystal_display>.

PCT International Search Report of the International Searching Authority from International Application No. PCT/US2010/043478, dated Nov. 17, 2010 (3 pages).

PCT International Written Opinion of the International Searching Authority from International Application No. PCT/US2010/043478, dated Nov. 17, 2010 (7 pages).

PCT IPRP of the International Searching Authority from International Application No. PCT/US2010/043478, dated Nov. 17, 2011 (9 pages).

* cited by examiner

MULTI-LAYER WAGERING GAME DISPLAY

REFERENCE TO RELATED APPLICATIONS

This application is related to and claims priority to U.S. Provisional Patent Application Ser. No. 61/472,256, filed Apr. 6, 2011, and titled "Multi-Layer Wagering Game Display," which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to displays for wagering games.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Displays, such as LCDs, have long been incorporated into gaming machines to enhance the flexibility of the displayed wagering games.

SUMMARY

In one aspect of the present concepts, a multi-layer display for a wagering game device includes a front liquid crystal panel assembly and a light guide frame disposed behind the front liquid crystal panel assembly, the light guide frame having external lateral dimensions substantially similar to that of the corresponding external lateral dimensions of the front liquid crystal panel assembly and the light guide frame defining an opening having internal lateral dimensions. At least one light source is provided and configured to provide lighting to the front light guide frame. A rear liquid crystal panel assembly disposed at least partially behind, or co-planar with, the light guide frame and a rear light guide panel disposed behind the rear liquid crystal display. At least one light source is provided and configured to provide lighting to the rear light guide panel. External lateral dimensions of the rear liquid crystal panel assembly are less than corresponding external lateral dimensions of the front liquid crystal panel assembly and the multi-layer display is configured to provide a first video layer on the front liquid crystal panel assembly and to provide a second video layer on the rear liquid crystal panel assembly.

According to another aspect of the present concepts, a display system for a wagering game device includes a projector, a rear projection screen positioned in front of the projector to receive light output from the projector, an optically transparent spacer disposed in front of the rear projection screen, and a liquid crystal panel assembly disposed in front of the optically transparent spacer. The projector is configured to output white light to the rear projection screen to provide a backlight to the liquid crystal panel assembly and emphasize a front image output by the liquid crystal panel or to output images to the rear projection screen to provide, in combination with a state wherein the liquid crystal panel does not emit light, a rear image on the rear projection screen.

According to one aspect of the present invention, a wagering game system includes a wager input device, a user input device, a controller configured to execute a wagering game responsive to a wager input into the wager input device and an instruction to execute the wagering game responsive to an input into the user input device, and a display device. The display device include a projector, a rear switchable liquid crystal panel positioned in front of the projector to receive light output from the projector, a front switchable liquid crystal panel positioned in front of the rear switchable liquid crystal panel to receive light output through the rear switchable liquid crystal panel, and a liquid crystal panel assembly disposed in front of the front switchable liquid crystal panel. The front switchable liquid crystal panel and/or the rear switchable liquid crystal panel are configured to provide one or more regions controlled by the controller that may be independently maintained in a different state than other regions of the respective one of the front switchable liquid crystal panel and the rear switchable liquid crystal panel. The projector is configured to output light to the liquid crystal panel through the front switchable liquid crystal panel and the rear switchable liquid crystal panel to provide a backlight for the liquid crystal panel.

According to another aspect of the invention, a multi-layer display for a wagering game device comprises a front liquid crystal panel assembly and a light guide frame disposed behind the front liquid crystal panel assembly, the light guide frame having external lateral dimensions substantially similar to that of the corresponding external lateral dimensions of the front liquid crystal panel assembly and the light guide frame defining an opening having internal lateral dimensions. The multi-layer display also includes at least one light source configured to provide lighting to the front light guide frame and a rear liquid crystal panel assembly disposed at least partially behind, or co-planar with, the light guide frame. The multi-layer display also includes a rear light guide panel disposed behind the rear liquid crystal panel and at least one light source configured to provide lighting to the rear light guide panel. In this multi-layer display, the external lateral dimensions of the rear liquid crystal panel assembly are less than corresponding external lateral dimensions of the front liquid crystal panel assembly. The multi-layer display is configured to provide a first video layer on the front liquid crystal panel assembly and to provide a second video layer on the rear liquid crystal panel assembly.

According to yet another aspect of the present concepts, a display system for a wagering game device, comprises a projector, a rear switchable liquid crystal panel positioned in front of the projector to receive light output from the projector, a front switchable liquid crystal panel positioned in front of the rear switchable liquid crystal panel to receive light output through the rear switchable liquid crystal panel, an optically transparent substrate disposed in front of the front switchable liquid crystal panel, and a liquid crystal panel assembly disposed in front of the optically transparent substrate. The projector is configured to output white light to the rear switchable liquid crystal panel to provide a backlight to the front switchable liquid crystal panel when the display system is in a first state and the projector is further configured to output white light to the front switchable liquid crystal panel to provide a backlight to the liquid crystal panel when the display system is in a second state.

According to yet another aspect of the present concepts, a display system for a wagering game device includes a projector, a rear switchable liquid crystal panel positioned in front of the projector to receive light output from the projector, a front switchable liquid crystal panel positioned in front of the rear switchable liquid crystal panel to receive light output through the rear switchable liquid crystal panel, and a liquid crystal panel assembly disposed in front of the front switchable liquid crystal panel. The projector is configured to output white light incident to the rear switchable liquid crystal panel and at least one portion of the rear switchable liquid crystal panel is switchable and is configured to assume a translucent state when switched off and to assume a transparent state when switched on. At least one portion of the front switchable liquid crystal panel is switchable and is configured to assume a translucent state when switched off and to assume a transparent state when switched on and at least one switchable portion of the front switchable liquid crystal panel is disposed over a corresponding at least one switchable portion of the rear switchable liquid crystal panel.

According to yet another aspect of the present concepts, a wagering game system includes a wager input device, a user input device, a controller configured to execute a wagering game responsive to a wager input into the wager input device and an instruction to execute the wagering game responsive to an input into the user input device; and a display device, the display device comprising a projector, a rear switchable liquid crystal panel positioned in front of the projector to receive light output from the projector, a front switchable liquid crystal panel positioned in front of the rear switchable liquid crystal panel to receive light output through the rear switchable liquid crystal panel, and a liquid crystal panel assembly disposed in front of the front switchable liquid crystal panel. At least one of the front switchable liquid crystal panel and the rear switchable liquid crystal panel is configured to provide one or more regions controlled by the controller that may be independently maintained in a different state than other regions of the respective one of the front switchable liquid crystal panel and the rear switchable liquid crystal panel. The projector is configured to output light to the liquid crystal panel through the rear switchable liquid crystal panel and the front switchable liquid crystal panel to provide a backlight for the liquid crystal panel and image data may be selectively portrayed on a respective one or more regions of one of the front switchable liquid crystal panel or the rear switchable liquid crystal panel when such respective one or more regions are in a translucent state.

The above features and advantages, and other features and advantages of the present invention, will be readily apparent from the following detailed description of the preferred embodiments and best modes for carrying out the present invention when taken in connection with the accompanying drawings and appended claims.

Figure 1:
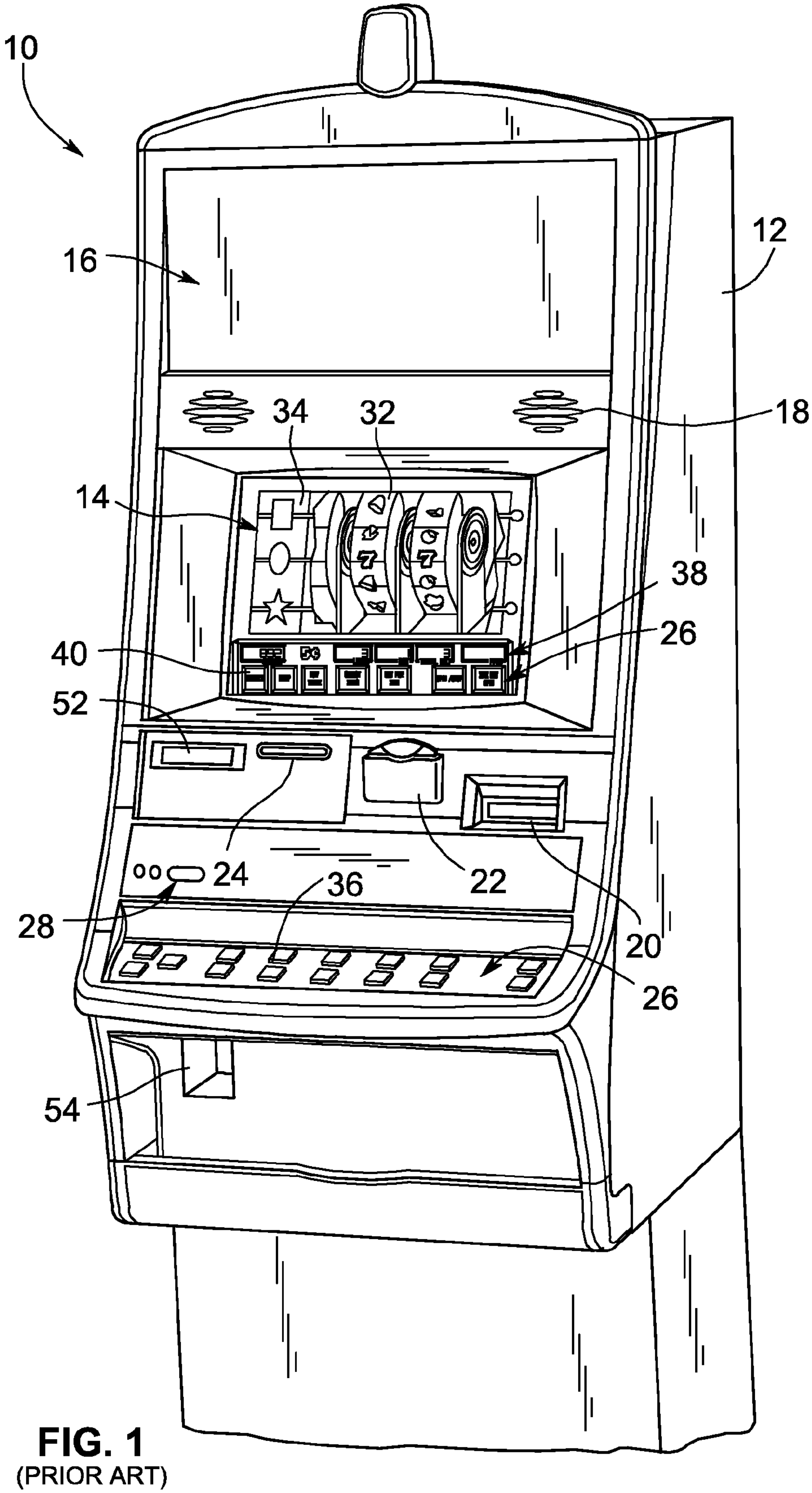
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled “Handheld Device for Wagering Games,” which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. Nos. 6,517,433 and 7,458,890 entitled "Reel Spinning Slot Machine With Superimposed Video Image," U.S. Pat. No. 7,585,220 entitled "Gaming Machine with Superimposed Display Image"), U.S. Pat. No. 7,654,889 entitled "Wagering Game with Simulated Mechanical Reels, U.S. Published Patent Application No. US 2010/0190552 A1 entitled "LCD Display for Gaming Device With Increased Apparent Brightness," and U.S. Published Patent Application No. US 2010/0081502 A1 entitled "System, Apparatus And Methods For Improved Transmissivity Of LCD Panel," each of which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
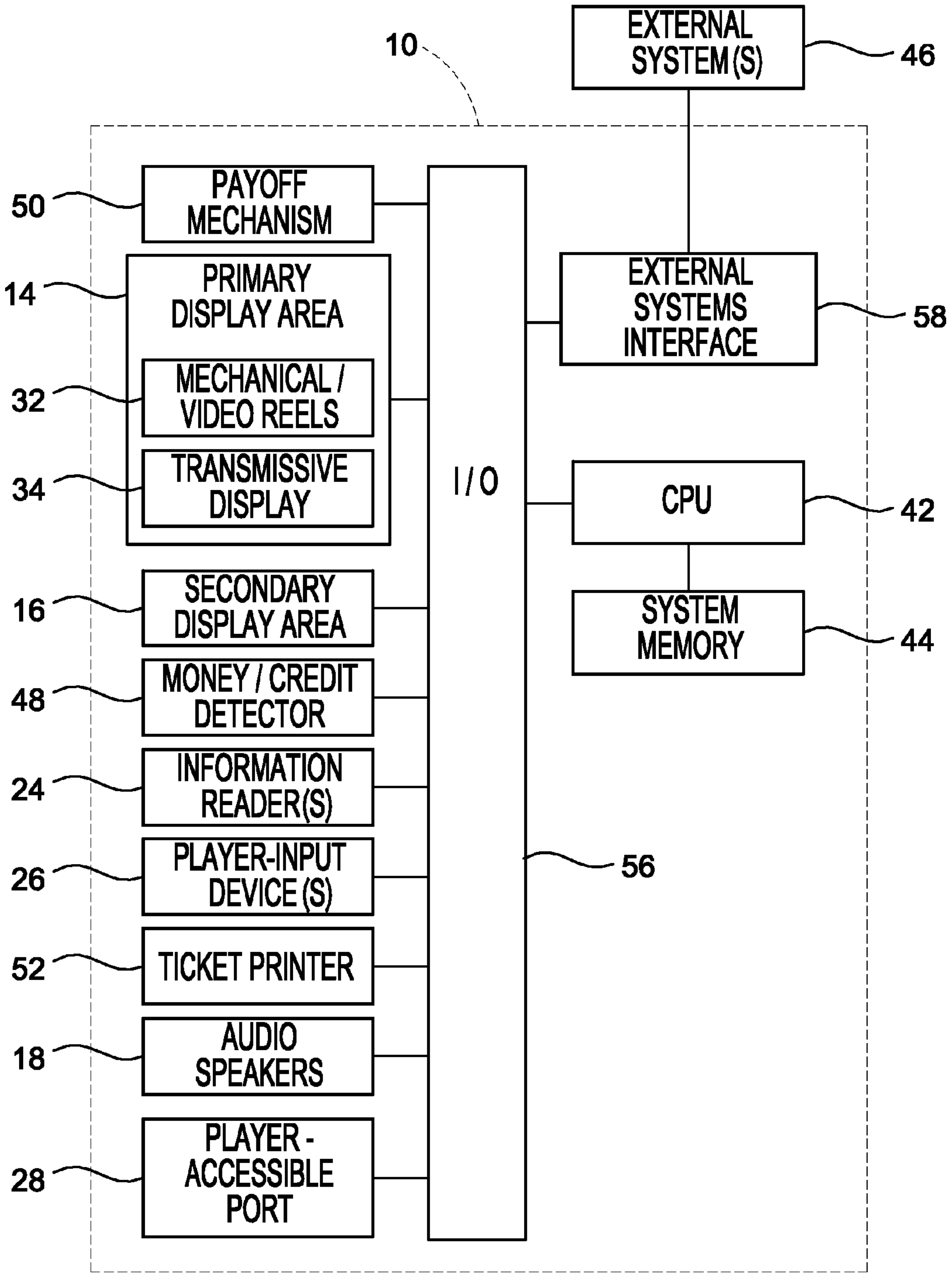
FIG. 2 (PRIOR ART)
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
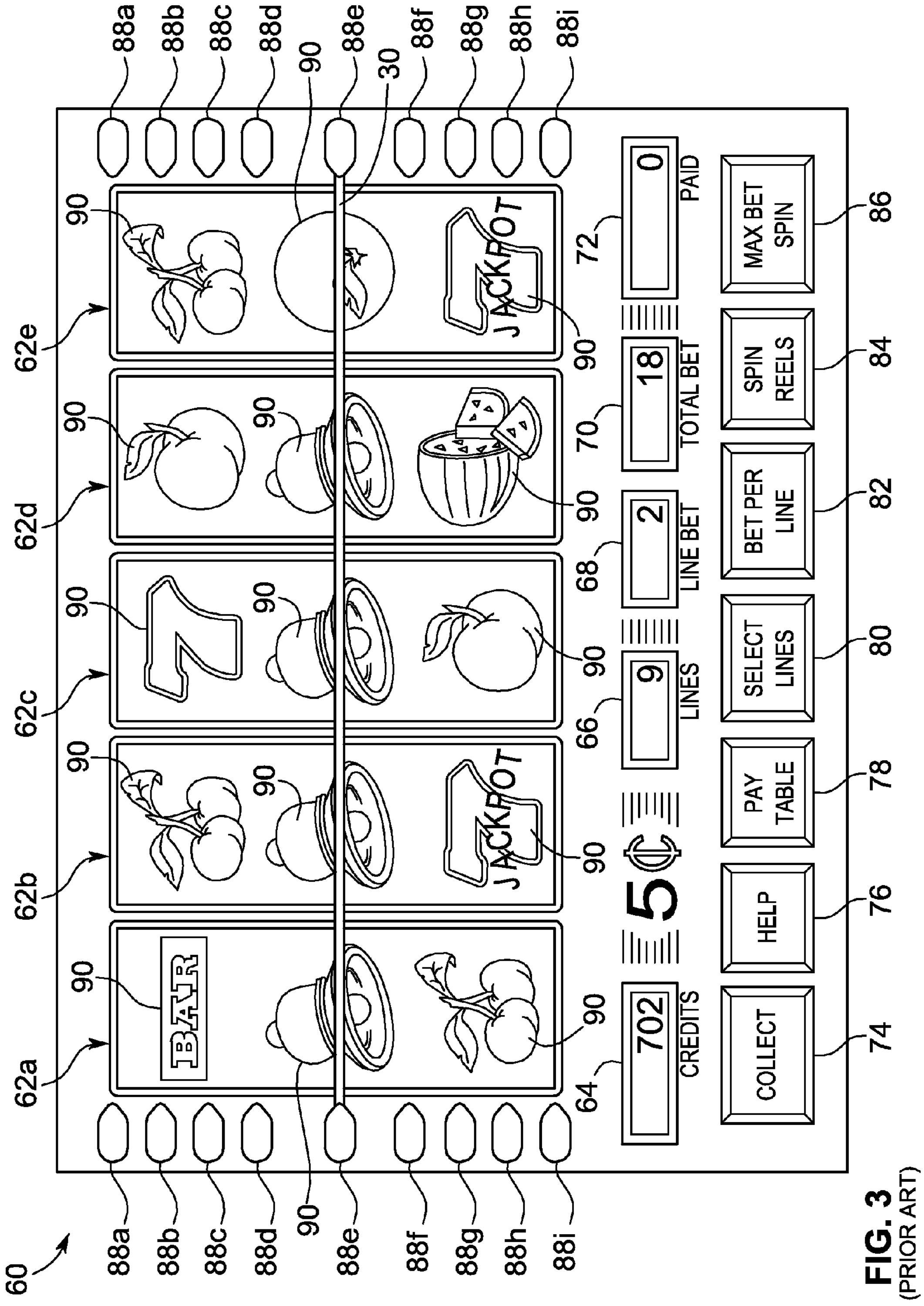
FIG. 3 (PRIOR ART)
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

A liquid crystal panel, as used herein, differs from a conventional liquid crystal display in that the liquid crystal "display" is a complete assembly comprising a suitable active or passive backlighting and capable of displaying an image, whereas the liquid crystal panel is just the liquid crystal with its front and rear glass substrates and associated electrodes (e.g., ITO). In some aspects, the liquid crystal panel may optionally further comprise, in various embodiments, the front polarizer only, the rear polarizer only, or both the front and the rear polarizers, depending on the usage of the liquid crystal panel in combination with other elements and/or the type of light utilized (e.g., polarized light). The omission of a layer of polarization may be utilized, for example, where the light passed through the liquid crystal panel is itself polarized in a suitable orientation. By way of example, non-polarized light is output from a projector, as noted herein, to be incident onto a back polarizing film of a liquid crystal panel and the light output from the back polarizing film is oriented to a single state of polarization that is perpendicular to that of a front polarizing film. The polarized light then passes through a liquid crystal layer (e.g., twisted nematic liquid crystal).

Figure 4:
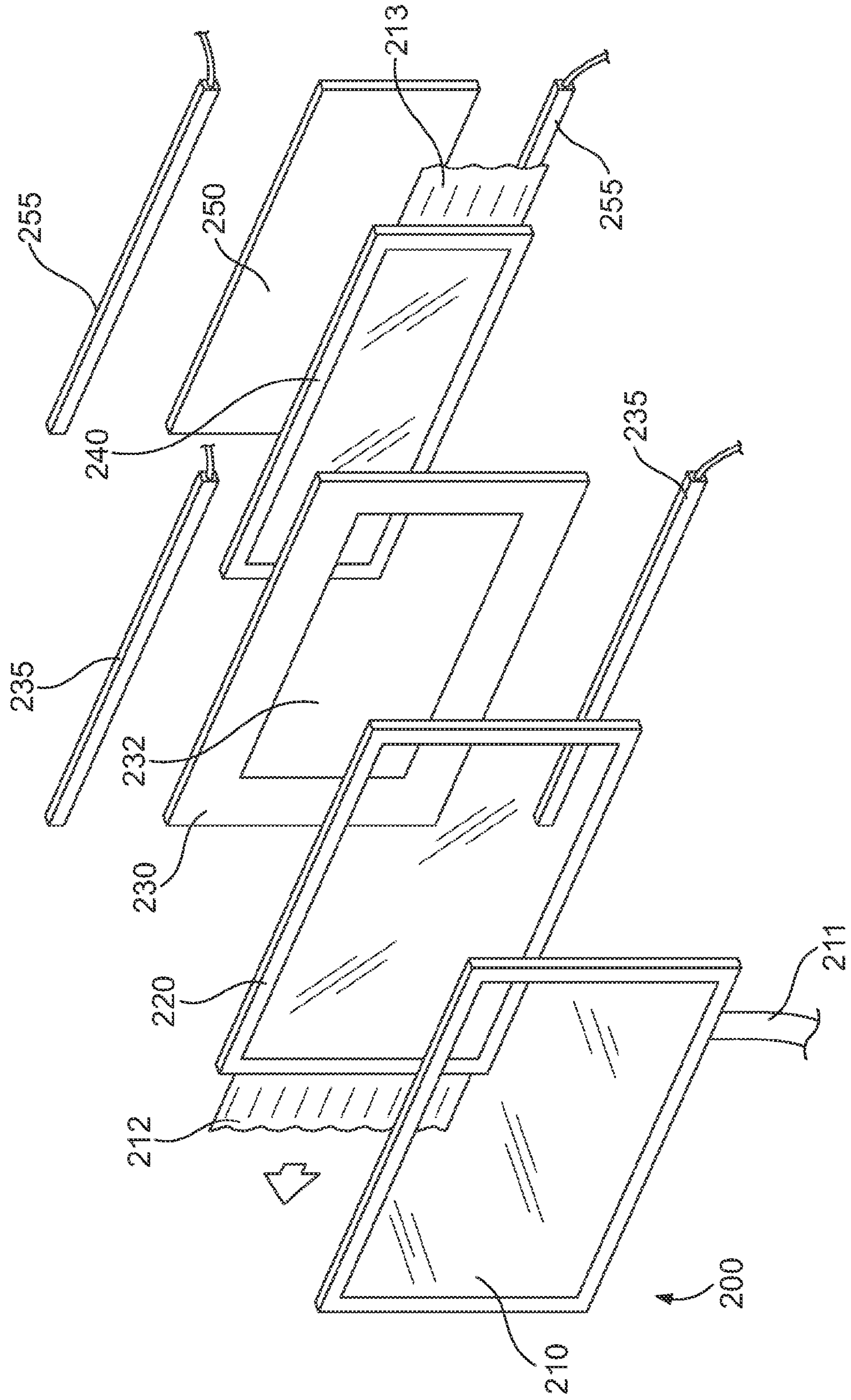
FIGS. 4-5 show an example of a multi-level display device in accord with at least some aspects of the present concepts.
Figure 5:
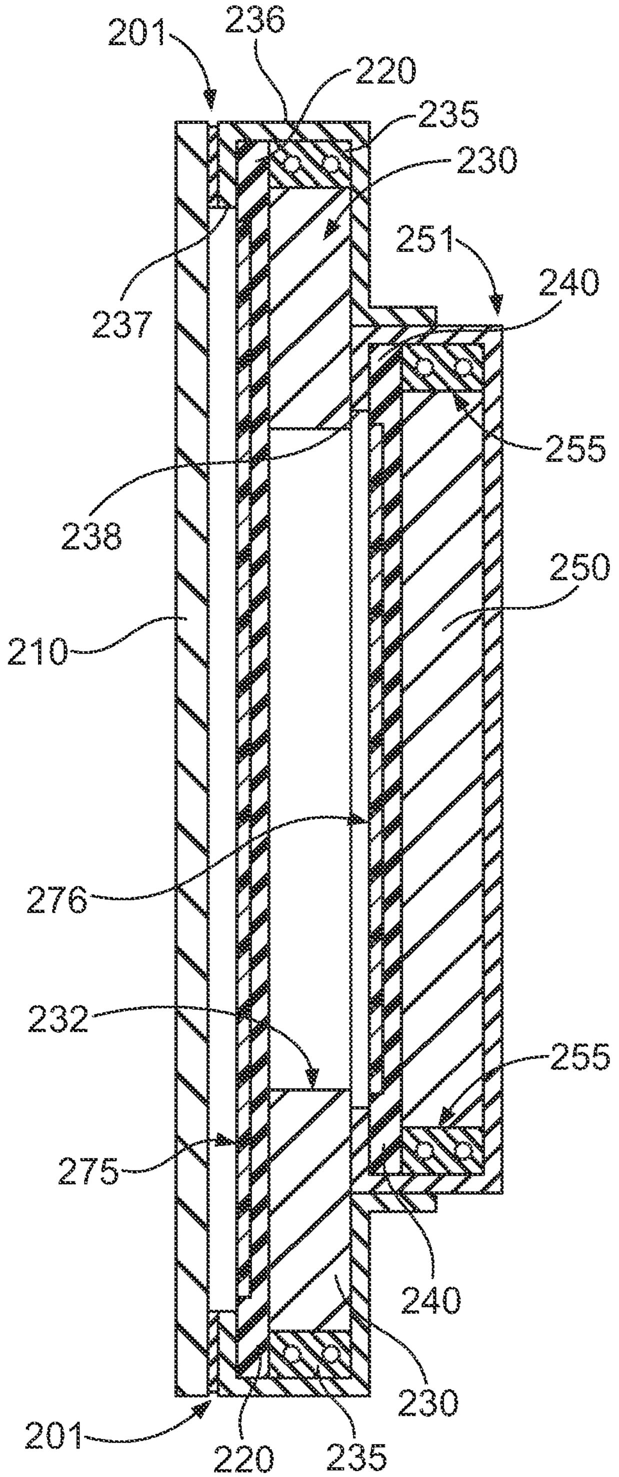

FIGS. 4-5 show an example of a multi-level display in accord with some aspects of the present concepts. In particular, FIGS. 4-5 show a dual liquid crystal panel display 200. A touch screen 210 is overlaid on a primary liquid crystal panel 220, such as represented in FIGS. 4-5, to permit touch-based or near-touch-based (proximity) input. Flex ribbon cabling 211 (e.g., HSC-type flex cable) is shown at the bottom of the touch screen 210 and connects the touch screen, directly or indirectly, to the controller 42, such as through a printed circuit board (PCB) connector. The primary liquid crystal panel 220 is also shown with flex ribbon cabling 212, which likewise connects the primary liquid crystal panel 220, directly or indirectly, to the controller 42, such as through a PCB connector. In other aspects, the touch screen may be integrated with, or disposed directly on, the primary liquid crystal panel 220. The touch screen may comprise any technology adapted to localize of a users' input including, but not limited to, a resistive touchscreen, a surface acoustic wave (SAW) touchscreen, a capacitive touchscreen (e.g., surface capacitance, Projected Capacitive Touch (PCT), mutual capacitance sensors, self-capacitance sensors, etc.), an infrared touchscreen, an optical imaging touchscreen, or a dispersive-signal-based touchscreen (e.g., utilizing the piezoelectric effect).

Behind the primary liquid crystal panel 220 is dis-posed a front light guide frame 230. At or near the top and bottom of the front light guide frame 230 are disposed light sources 235 such as, but not limited to, cold cathode fluorescent lamps (CCFLs) or light emitting diodes (LEDs), used to output light into the edges of the front light guide frame. In alternative configurations, light sources 235 could be option-ally provided on the lateral or side edges of the front light guide frame 230 as well, or could be provided only on the lateral or side edges of the front light guide frame 230. Behind the front light guide frame 230 is the secondary liquid crystal panel 240 and a rear light guide panel 250 therebehind. Flex ribbon cabling 213 (e.g., HSC type flex cable) connects the secondary liquid crystal panel 240, directly or indirectly, to the controller 42, such as through a PCB connector. As can be seen in FIG. 4, the secondary liquid crystal panel 240 is smaller than the primary liquid crystal panel 220. Light sources 255 such as, but not limited to, CCFLs or LEDs, are disposed at or near upper and lower surfaces of the rear light guide panel 250 to provide output light into the edges of the rear light guide frame 250. In alternative configurations, light sources 255 could be optionally provided on the lateral or side edges of the rear light guide frame 250 as well, or could be provided only on the lateral or side edges of the rear light guide frame. The front panel could also have an array of LEDs instead of edge lighting.

Alternatively, or in addition to one of the above-described illumination variants, the rear light guide panel 250 can be illuminated by backlighting, such as by a panel of LEDs disposed behind the rear light guide panel or by another backlighting light source (e.g., projector, bulb(s), etc.).

In an optional configuration, light sources 235, 255 may be located apart from the front light guide frame 230 and/or rear light guide frame 250, with illumination output into one or more edges via light pipes. Thus, the respective light sources may be provided remotely from (e.g., elsewhere in the wagering game machine 10), rather than adjacent to, the front light guide frame 230 and/or rear light guide frame 250. It is further noted that the light source 235 and the light source 255 may comprise different types of light sources.

FIG. 5 shows a cross-sectional side view of the assembled dual liquid crystal panel 200 represented in FIG. 4. In FIG. 5, the touch screen 210 is shown as being disposed adjacent the primary liquid crystal panel 220 so as to overlay the primary liquid crystal panel. The touch screen 210, in the depicted configuration, is connected to a first housing member 236 of the dual liquid crystal panel 200 by a spacer 201 that may advantageously serve additional functions such as vibration attenuation and adhesion. Within the first housing member 236 are disposed the primary liquid crystal panel 220 and, therebehind, the front light guide frame 230 and light sources 235 represented as two circles, denoting two CCFLs in this example, with the light source being disposed at the upper edge of the primary liquid crystal panel.

The first housing member 236 in turn is connected to the second housing member 251 in a conventional manner, such as by bonding, ultrasonic welding, fasteners, an interference fit, etcetera. Within the second housing member 251 are disposed the secondary liquid crystal panel 240 and, therebehind, the rear light guide panel 250 and light sources 255, again represented as two circles denoting two CCFLs, with the light source being disposed at the upper edge of the secondary liquid crystal panel. As is more clearly seen in FIG. 5 than FIG. 4, the secondary liquid crystal panel 240 is smaller than the primary liquid crystal panel 220.

The front light guide frame 230, as noted above, defines a window 232 through which the secondary liquid crystal panel 240 may be viewed. Likewise, the first housing member 236 defines a window 237 and the second housing member 251 defines a window 238. In this arrangement, the dual liquid crystal panel 200 provides a front video output, represented by single layer video image 275, and provides a rear video output, represented by video image 276, on secondary liquid crystal panel 240, as viewed through the primary liquid crystal panel 220, window 232 in the front light guide frame 230, and window 238 in the second housing member 251. As is shown in FIG. 5, the single layer video image 275 is backlit in part by the front light guide frame 230 (i.e., around a peripheral portion) and in part by the rear light guide panel 250 (i.e., around a central portion). The dual layer video image 276, on the other hand, is backlit by the rear light guide panel 250. Since the light output by the rear light guide panel 250 must pass through additional layers of color filters and polarization (e.g., passing through polarizers of two liquid crystal panels 220, 240), thereby resulting in greater attenuation than the light output by the front light guide frame 230, the luminosity of the rear light guide panel 250 and light source 255 combination is advantageously higher than that of the front light guide panel 230 and light source 235 combination. The dual layer video image 276 is, it some aspects, greater than or equal to the size of the window 232 formed by the front light guide frame 230 but its viewable area is limited to the size of the window 232.

The window 232 defined by the front light guide frame 230 is, in at least some aspects, equal in dimension to the secondary liquid crystal panel 240 or lesser in one or more dimensions (e.g., length and height) to that of the secondary liquid crystal panel.

In an alternative configuration to that shown in FIGS. 4-5, the secondary liquid crystal panel 240 may be disposed to be co-planar or substantially co-planar with the window 232 defined by the front light guide frame 230. Thus, a front plane of the secondary liquid crystal panel 240 may be disposed to be substantially flush with the front plane of the front light guide frame 230, or may be disposed to be parallel to, but set apart from (e.g., forward or rearward of) the front plane of the front light guide frame.

As noted above, the challenges relating to the conventional structure and operation of liquid crystal displays, including the use of polarizing films to create the image, various optical coatings for normal display use, and the attenuation through the liquid crystal medium, significantly impact the transmissivity of the liquid crystal display, let alone serial liquid crystal displays. Of course, transmissivity can be improved simply by using more light and make everything brighter, but this solution consumes significantly more power, generates significantly more heat, and increases operating costs, and is, therefore, impractical. A liquid crystal display works by polarizing the light entering it by using a polarizing film and the liquid crystal selectively rotates the plane of polarization at each pixel. If the output light plane of polarization matches output polarizer, the maximum light is seen (i.e., white light). If the output light is rotated 90° with respect to the output polarizer, the minimum light is seen (i.e., black).

In view of the above and in accord with aspects of the present invention, light entering the back of the primary or front liquid crystal panel 220 is polarized (at the appropriate plane of polarization) so that a back surface polarizing film is not needed (e.g., may be omitted or removed), thereby improving transmissivity through the liquid crystal panel. In one embodiment, in lieu of the light sources 255, or possibly even in combination therewith, an LCoS (Liquid Crystal on Silicon) projector is used to permit removal of or omission of the rear polarization screen, thereby increasing transmissivity and brightness.

Figure 6:
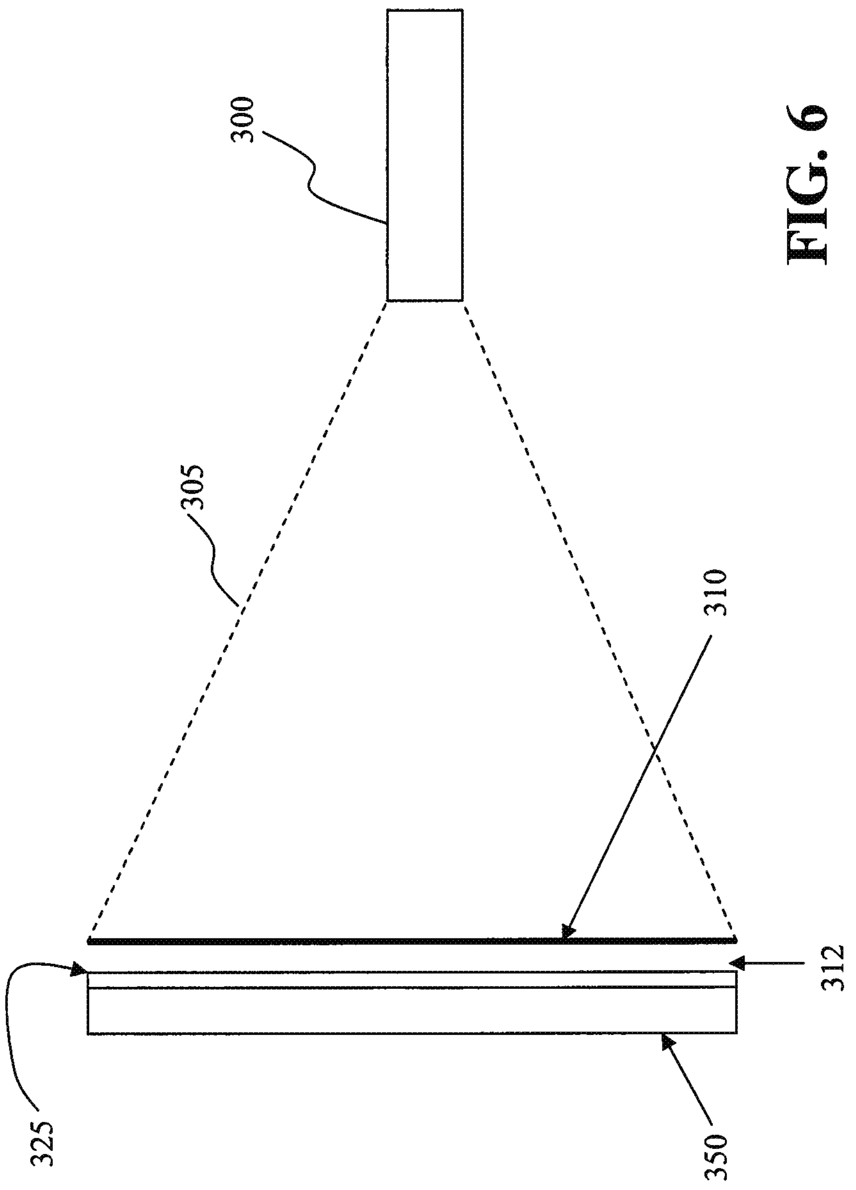
FIG. 6 is a representation of another embodiment of a multi-level display device in accord with at least some aspects of the present concepts.

FIG. 6 shows an embodiment wherein a projector 300 and projection screen 310 arrangement replaces the secondary liquid crystal panel 240 and rear light guide panel 250 of FIG. 4 as well as the front light guide frame 230 and light sources 235. In the embodiment of FIG. 6, the projector 300 outputs light 305 to a rear projection screen 310 disposed behind, and generally commensurate in size with, a liquid crystal panel 350. The projector 300 may comprise a standard projector configured to output non-polarized light, but may optionally be configured to output polarized light (e.g., an LCoS projector). Where polarized light is used, it is possible to remove the rear polarizer of the liquid crystal panel 350 (e.g., a TN or PVA panel display) to thereby decrease attenuation of the light and increase perceived brightness. The rear projection screen 310 is configured to be diffuse. One example of a suitable projection screen includes the Pro Display High Gain Rear Projection Window Advertising Screen, manufactured by Pro Display of Great Britain. Liquid crystal panel 350 may advantageously comprise a touch screen.

As shown in FIG. 6, there is optionally provided a gap between the rear projection screen 310 and the rear of an optically transparent spacer 325 disposed behind the liquid crystal display 350. The optically transparent spacer 325 may comprise any optically transparent material such as, but not limited to, glass or acrylic. The optically transparent spacer 325 has a thickness in a range of between about 1/16" to several inches in at least some aspects, but this thickness could optionally be greater or lesser. In one aspect, the combined thickness of the optically transparent spacer 325 and the air gap 312 is 1/16". This optional gap enhances a dual depth presentation of images through the liquid crystal panel 350. In areas where it is desired to display a "front" image, white light is output from the projector 300 onto the projection screen 310 and the front image is displayed on the liquid crystal panel 350. In areas where it is desired to display a "rear" image, such as video, such image(s) is/are output from the projector 300 onto the projection screen 310 and the liquid crystal panel 350 is placed in a state whereby the liquid crystals are arranged to pass the light emitted through the projection screen 310. This is typically by displaying full-white pixels on the liquid crystal display panel 350. It is also possible and advantageous to display images on both the liquid crystal panel 350 and the projection screen 310. The images on the liquid crystal panel 350 will appear translucent and allow at least partial visibility of the images on the projection screen 310. The images on the projection screen 310 will appear to be spaced behind the images on the liquid crystal panel 350; the apparent spaced depth is determined by the distance between the active layers in the liquid crystal panel 350 and the projection screen 310.

A translucent projection screen (e.g., 310) in accord with at least one of the present concepts may be disposed behind a secondary liquid crystal panel (e.g., 240) and would advantageously comprise openings where the reel windows are located. A projector mounted opposite the projection screen would project an image on the entire screen area of the secondary liquid crystal panel, including the reel windows, and the area not including the reel windows would have a white image projected onto it, which would, in turn, serve as the backlight for the primary liquid crystal panel. As noted above, the projector may comprise an LCoS device, wherein the projected image contains light that is polarized in one direction, permitting removal of the polarizing film from the back of the secondary liquid crystal panel and consequently improve the light efficiency of the display system. A translucent projection screen allows for easy customization for different window sizes, requiring only different die-cut thin translucent screens for displays having 3, 4 or 5 reels, which provides an advantage over the edge-lit plastic diffuser typically found in liquid crystal displays.

In accord with the example of FIG. 6, the projector 300 advantageously provides backlighting, through the rear projection screen 310, to the entirety of the liquid crystal panel 350. In yet another alternative embodiment, the air gap may be optionally omitted in favor of an increased depth of the physical spacer 325 to provide separation between the projection screen 310 and the liquid crystal panel 350 to provide the noted dual depth presentation of images through the liquid crystal panel 350. In some aspects, the spacing of the projector from the projection screen is between about 5"-15", but the spacing could be of a greater or lesser distance and the spacing is determined by factors including the projection lens design.

In the embodiment of FIG. 6, no side or edge lighting is involved, which provides a more energy efficient lighting solution and, moreover, provides move even lighting, making better use of output light, and provides additional flexibility in design and construction (e.g., scaling, etc.).

The configuration of FIG. 6 provides a flat rear image, with a translucent front image that appears to be spaced in front of the rear image, desirably providing a rear image behind an apparently opaque front image that has windows to allow for viewing of the rear image.

Figure 7A:
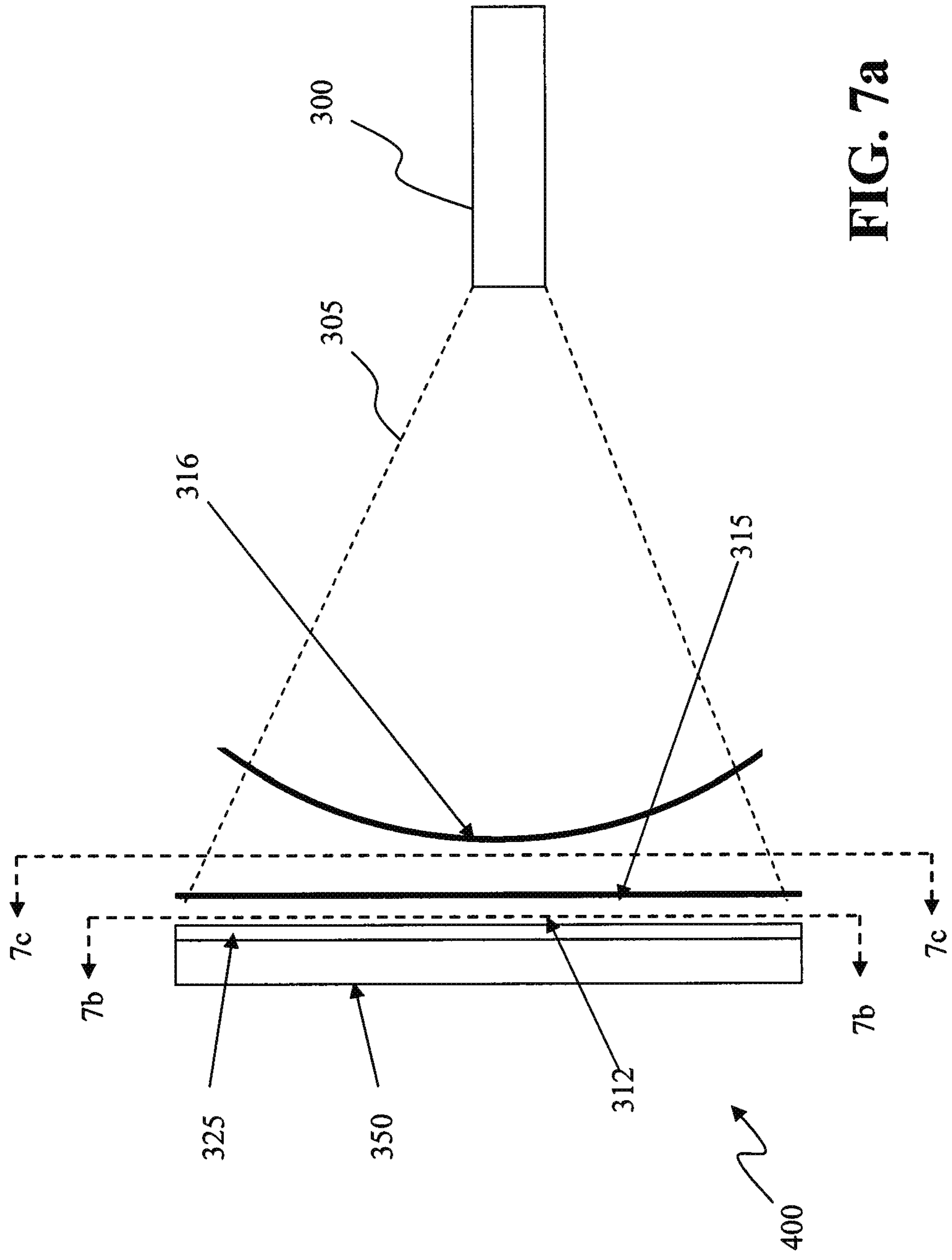
FIG. 7*a* is a representation of yet another embodiment of a multi-level display device in accord with at least some aspects of the present concepts.

FIG. 7*a* shows another embodiment wherein the projector 300 outputs light 305 to a curved window switchable liquid crystal panel 316 with clear leads positioned behind a planar switchable liquid crystal panel 315. One suitable switchable liquid crystal panel that may be used for either, or both of, the curved window switchable liquid crystal panel 316 and planar switchable liquid crystal panel 315 is the Pro Display Switchable LCD Film or switchable smart glass, manufactured by Pro Display of Great Britain. Whereas the liquid crystal 220 of FIGS. 4-5 is configured to rotate the light polarization to create various light transmission levels on a pixel-by-pixel basis, the liquid crystal panels 315, 316 are, in at least some aspects, configured to assume one of two states, either clear or translucent on a pixel-by-pixel basis.

The orientation of the liquid crystals in the liquid crystal layer of liquid crystal panels 315, 316 may be selectively controlled by applying a desired voltage to transparent electrodes disposed on the adjacent glass substrates. In particular, the orientation of the liquid crystals in the liquid crystal layer may be selectively controlled to rotate the incoming polarized light 90°. For example, when no voltage is applied to the electrodes (an "off" state), the twisted nematic liquid crystal layer may be adapted to rotate the incoming polarized light 90°, so that it is of the same polarization as the front polarizing film and may pass therefore through the front polarizing film (e.g., to form an "on" or "bright" pixel). Conversely, in such example, when voltage is applied to the electrodes (an "on" state), the twisted nematic liquid crystal layer does not rotate the incoming polarized light and outputs linearly polarized light that is perpendicular to a direction of polarization for the front polarizing film and is correspondingly blocked by the front polarizing film (e.g., to form an "off" or "dark" pixel). Likewise, intermediate voltages produce intermediate degrees of twist of the twisted nematic liquid crystal layer and accordingly produce a spectrum of outputs.

Again, as with the embodiment of FIG. 6, the projector 300 illuminates the rear of the whole liquid crystal panel 350, not just a portion of the display, such as cutouts or reels. As with the embodiment of FIG. 6, the projector 300 may be configured to output polarized light (e.g., an LCoS projector) or may output non-polarized light and, where polarized light is used, it is possible to remove the rear polarizer of the liquid crystal panel 350 to thereby decrease attenuation of the light and increase perceived brightness. There is, likewise, an optionally provided gap 312 between the front switchable liquid crystal panel 315 and the rear of an optional optically transparent spacer 325 disposed behind the liquid crystal panel 350. As previously noted, by way of example, the optically transparent spacer 325 has a thickness in a range of between about 1/16" to several inches and the optional gap 312 enhances a dual depth presentation of images through the liquid crystal panel 350 for the liquid crystal panel 350 without providing a depth appearance. This is advantageous because it also makes the images present on the liquid crystal panel 350 appear to be opaque.

Figure 7B:
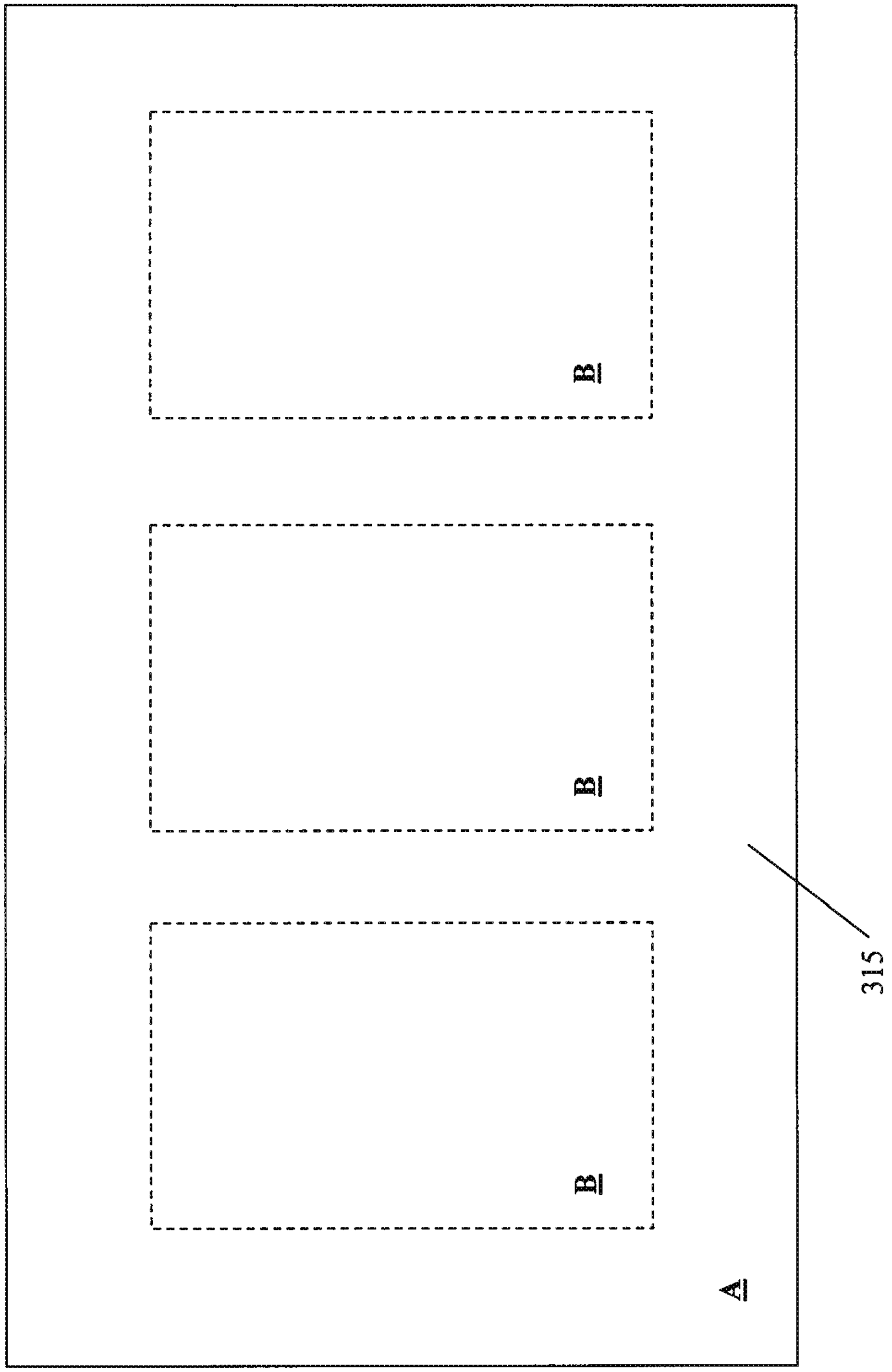
FIGS. 7*b*-7*c* are views of FIG. 7*a* along the view lines shown in FIG. 7*a* showing at least some aspects of the present concepts.
Figure 7C:
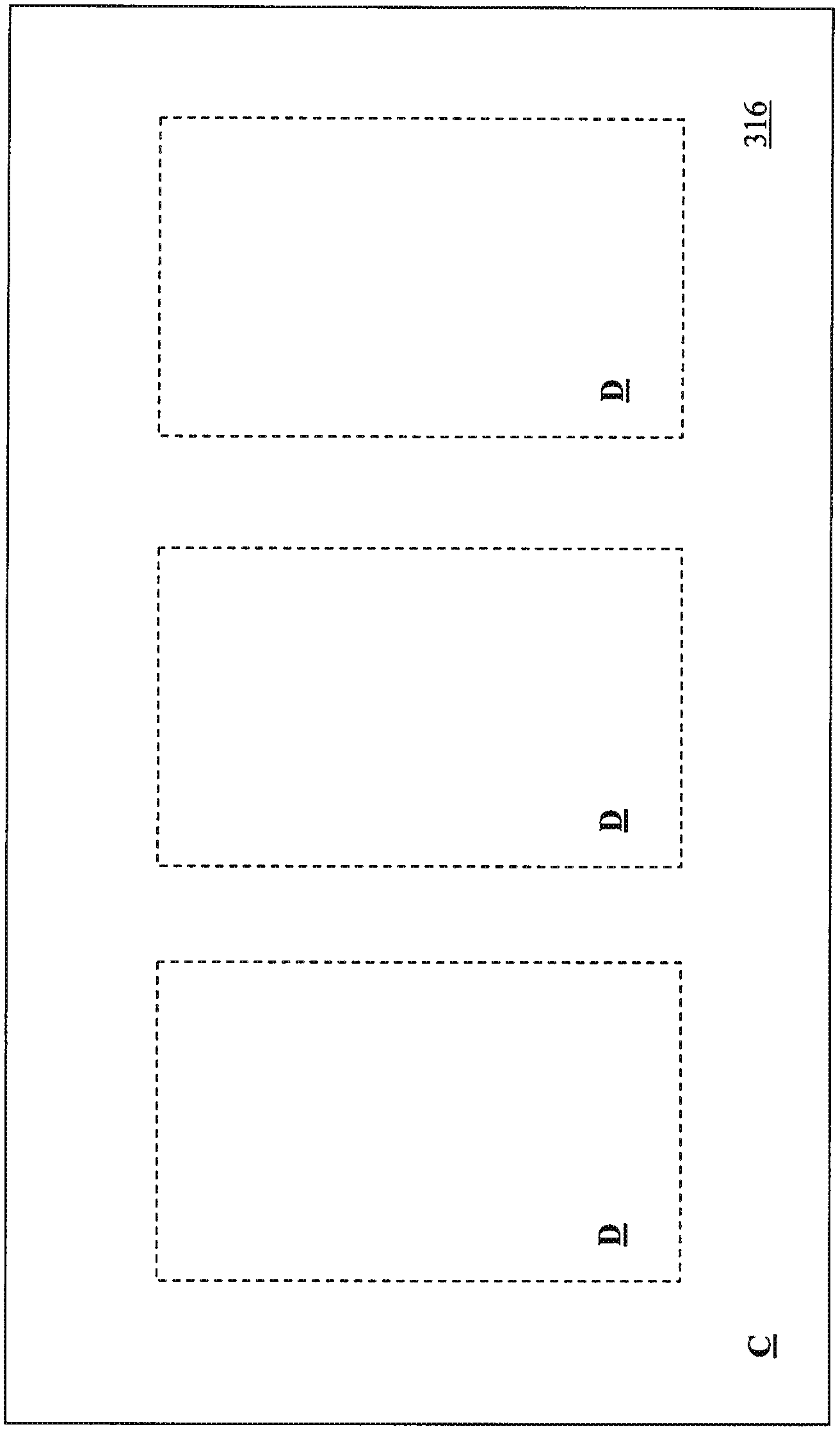

FIGS. 7*a*-7*c* show some aspects of the present concepts wherein a front screen and a rear screen are used in combination to enable switching back and forth, as desired, between rear and front displayed images. In the illustrated example, a curved rear screen 316 is used to better simulate an appearance of a mechanical reel for the rear image. In FIGS. 7*a*-7*c*, the action of the projector 300, curved window switchable liquid crystal panel 316, front planar switchable liquid crystal panel 315, and liquid crystal panel 350, permit switching back and forth between, for example, a flat rear image (e.g., the combination of images on 350, 315) and a curved rear image (e.g., the combination of images on 350, 316), as viewed from the perspective of the player of the wagering game machine 10. The system can thus permit switching between rear and front images.

For example, in a first state, the front planar switchable liquid crystal panel 315 is in a translucent state (off) while the curved window switchable liquid crystal panel 316 is in a transparent state (on), thereby providing a display of a flat, front image through liquid crystal panel 350. Continuing with this example, in a second state, the front planar switchable liquid crystal panel 315 is in a transparent state (on) while the curved window switchable liquid crystal panel 316 is in a translucent state (off), thereby providing a display of a curved rear image through liquid crystal panel 350. By switching from the first state to the second state, two different configurations of dual depth displays can be realized, one with a flat front image (e.g., on the front planar switchable liquid crystal panel 315 when the front planar switchable liquid crystal panel 315 is in a translucent state and the rear, curved switchable liquid crystal panel 316 is in a transparent state) and one with a curved rear image (e.g., on the rear, curved window switchable liquid crystal panel 316 when the rear, curved switchable liquid crystal panel 316 is in a translucent state and the front planar switchable liquid crystal panel 315 is in a transparent state).

Further, one or both of the curved window switchable liquid crystal panel 316 and the front planar switchable liquid crystal panel 315 comprise, via arrangement of the clear leads (i.e., transparent conductors such as, but not limited to, indium tin oxide (ITO), indium antimony oxide (IAO), indium zinc oxide (IZO), conductive polymers, etc.), any number of separately switchable regions that can be used to selectively make one or more portions of the curved window switchable liquid crystal display panel 316 and/or the front planar switchable liquid crystal panel 315 transparent or translucent, in any desired combination. In general, however, it is desired that any given overlapping portion of the curved window switchable liquid crystal panel 316 and the front planar switchable liquid crystal panel 315 will have one transparent portion (e.g., front or rear) and one translucent portion (e.g., the other one of the front or rear) at any given time. Thus, for example, the curved window switchable liquid crystal display panel 316 comprises one or more windows or pre-defined switchable areas configured to be switchable on and off, while the remainder of the curved window switchable liquid crystal display panel 316, such as a peripheral portion or portions, stays transparent (e.g., on) all the time. The front planar switchable liquid crystal panel 315 could do the reverse, and have correspondingly shaped and situated windows or pre-defined switchable areas configured to be switchable off to on, while the remainder of the front planar switchable liquid crystal display panel 316, such as a peripheral portion or portions, stays translucent (e.g., off) all the time. Optionally, as another example, the front planar switchable liquid crystal panel 315 could comprise a uniform switchable film that has a fixed translucent film above (or below) it, with this additional fixed film having cutouts for the windowed areas.

The shape and sizes of the windowed areas in 315 and 316 must account for the field of view of the projector and the distortion caused by the curved screen. This will result in the windows in 315 and 316 not being identical in shape and size.

FIG. 7*b* shows a rudimentary representation of a front view of the dual depth display 400, as viewed from the perspective of the player of the wagering game machine 10. In FIG. 7*b*, there are shown liquid crystal switched regions “B” of the front planar switchable liquid crystal panel 315 that are switchable between a transparent state and a translucent state. In FIG. 7*b*, the liquid crystal switched regions “B” are shown to generally represent a 3-reel wagering game configuration. In the state represented in FIG. 7*b*, the front planar switchable liquid crystal panel 315 has a voltage applied to the liquid crystal switched regions “B” and is in a transparent state (on) in at least those regions (e.g., it could optionally remain in a transparent state (on) in region “A”). FIG. 7*c* shows a representation of the curved window switchable liquid crystal display liquid crystal panel 316 disposed behind the front planar switchable liquid crystal panel 315, wherein region “C” is presented to be in the “off” state so as to be translucent. Peripheral region “D” is also presented to be in the “off” state so as to be translucent. As noted above with respect to the fixed translucent film, in some aspects peripheral region “D” may be maintained as translucent at all times. Images may thus be displayed on the curved window switchable liquid crystal display liquid crystal panel 316 to provide the curved appearance of mechanical reels, such simulated reels being viewable through the front planar switchable liquid crystal panel 315. In this combined state represented in FIGS. 7*b*-7*c*, the curved window switchable liquid crystal panel 316 may be selected to backlight the entirety of the front planar switchable liquid crystal panel 315 in regions “A” and “B” or may alternatively be selected to display reel images in regions “D” with the corresponding regions “B” of the front planar switchable liquid crystal panel 315 being switched on so as to be transparent. A monochrome liquid crystal panel could be used for front planar switchable liquid crystal panel 315.

In various aspects, one or both the curved window switchable liquid crystal panel 316 and the front planar switchable liquid crystal panel 315 comprise one or more regions, whether individual pixels or small or large groups of pixels, that are independently switchable. In the example of FIGS. 7*b*-7*c*, for example, the area of the curved window switchable liquid crystal panel 316 corresponding to region “A” of the front planar switchable liquid crystal panel 315 in FIG. 7*b* could thus be made transparent with the region “A” of the front planar switchable liquid crystal panel 315 then having no voltage applied thereto, so as to make the liquid crystal switched region “A” in FIG. 7*b* translucent. For a given pixel or region, the front planar switchable liquid crystal panel 315 and the curved window switchable liquid crystal panel 316 may advantageously be in opposite states at any given time.

The configuration described above with respect to FIGS. 7*b*-7*c* could be reversed, at any desired time, to provide a different state, for example, wherein the liquid crystal switched regions “B” of FIG. 7*b* correspond to regions on the curved switchable liquid crystal panel 316 rather than regions of the front planar switchable liquid crystal panel 315 and the region “C” of FIG. 7*c* corresponds to regions on the front planar switchable liquid crystal panel 315 rather than the curved switchable liquid crystal panel 316. Thus, the display of images output from the projector 300 could be displayed on the regions “B” on the curved window switchable liquid crystal panel 316 (not shown) so as to simulate the display of a mechanical reel behind the liquid crystal panel 350. Region “A” of the curved window switchable liquid crystal display liquid crystal panel 316 (not shown) could be in an “off” state so as to be translucent or could be in an “on” state so as to be transparent. Correspondingly, the front planar switchable liquid crystal panel 315 in region “C” would be transparent to permit viewing of region “B” of the curved window switchable liquid crystal display liquid crystal panel 316 therebehind.

In accord with the above concepts, the multi-layer or multi-level display is configured with a projection screen to carry a second layer of video images behind the primary LCD and/or serve as a backlight for the primary LCD when white light is projected onto the projection screen. The projection screen receives its images from a video projector.

In an optional configuration, the rear window switchable liquid crystal panel 316 may optionally be planar, rather than curved.

In another optional configuration, the relative positions of the front switchable liquid crystal panel 315 and the curved rear window switchable liquid crystal panel 316 may optionally be alterable. For example, the front switchable liquid crystal panel 315 is movable, via actuators, from a first position relative to the rear window switchable liquid crystal panel 316 to a second position relative to the rear window switchable liquid crystal panel, the second position being closer to or farther from the rear window switchable liquid crystal panel than the first position. In a similar vein, the projector 300 may be configured to optionally move closer to or farther from the rear window switchable liquid crystal panel 316.

It yet another configuration, additional layers of switchable liquid crystal panels may be utilized. For example, further to the front switchable liquid crystal panel 315, one or more switchable liquid crystal panels, either flat or curved, could be disposed in front of, or behind, the curved rear window switchable liquid crystal panel 316. Likewise, more than two switchable liquid crystal panels of any type (e.g., planar or curved), may be provided in any combination, between the projector and the liquid crystal display.

While the present invention has been described with reference to one or more particular embodiments, those skilled in the art will recognize that many changes may be made thereto without departing from the spirit and scope of the present invention (e.g., a plurality of projectors may be provided). Each of these embodiments and obvious variations thereof is contemplated as falling within the spirit and scope of the claimed invention, which is set forth in the following claims.

What is claimed is:

1. A multi-layer display for a wagering game device comprising:

a front liquid crystal panel assembly;

a front light guide frame disposed behind the front liquid crystal panel assembly, the front light guide frame having external lateral dimensions substantially similar to that of corresponding external lateral dimensions of the front liquid crystal panel assembly and the front light guide frame defining an opening having internal lateral dimensions;

at least one light source configured to provide lighting to the front light guide frame;

a rear liquid crystal panel assembly disposed at least partially behind, or co-planar with, the front light guide frame;

a rear light guide panel disposed behind the rear liquid crystal panel assembly; and at least one light source configured to provide lighting to the rear light guide panel, wherein external lateral dimensions of the rear liquid crystal panel assembly are less than corresponding external lateral dimensions of the front liquid crystal panel assembly, and wherein the multi-layer display is configured to provide a first video layer on the front liquid crystal panel assembly and to provide a second video layer on the rear liquid crystal panel assembly.

2. The multi-layer display for the wagering game device according to claim 1, wherein the rear liquid crystal panel has external lateral dimensions equal to that of corresponding interior lateral dimensions of the front light guide frame.

3. The multi-layer display for the wagering game device according to claim 2, wherein the rear liquid crystal panel is disposed within and substantially co-planar with the opening of the front light guide frame.

4. The multi-layer display for the wagering game device according to claim 1, wherein the rear liquid crystal panel has external lateral dimensions larger than that of corresponding interior lateral dimensions of the front light guide frame.

5. The multi-layer display for the wagering game device according to claim 1, wherein the at least one light source configured to provide lighting to the front light guide frame comprises opposing edge light sources.

6. The multi-layer display for the wagering game device according to claim 5, wherein the opposing edge light sources comprise cold-cathode fluorescent lamps.

7. The multi-layer display for the wagering game device according to claim 1, wherein the at least one rear source configured to provide lighting to the rear light guide panel comprises opposing cold-cathode fluorescent lamps edge light sources.

8. The multi-layer display for the wagering game device according to claim 1, wherein a luminosity of the rear light guide panel and light source combination is greater than a luminosity of the front light guide frame and light source combination.

9. The multi-layer display for the wagering game device according to claim 1, wherein a single layer video image displayed on the front liquid crystal panel assembly is backlit, in combination, by the rear light guide panel and light source combination and the front light guide frame and light source combination.

10. The multi-layer display for the wagering game device according to claim 1, wherein the at least one light source configured to provide lighting to the rear light guide panel comprises LEDs.

11. The multi-layer display for the wagering game device according to claim 1, wherein the front light guide frame has external vertical dimensions substantially similar to that of corresponding external vertical dimensions of the front liquid crystal panel assembly and the front light guide frame defining an opening having internal vertical dimensions and wherein external vertical dimensions of the rear liquid crystal panel assembly are less than corresponding external vertical dimensions of the front liquid crystal panel assembly.

12. A method of assembling a multi-layer display for a wagering game device comprising the acts of:

disposing a front light guide frame behind a front liquid crystal panel assembly, the front light guide frame having external lateral dimensions substantially similar to that of corresponding external lateral dimensions of the front liquid crystal panel assembly and the front light guide frame defining an opening having internal lateral dimensions;

disposing at least one light source to provide lighting to the front light guide frame;

disposing a rear liquid crystal panel assembly disposed at least partially behind, or co-planar with, the front light guide frame;

disposing a rear light guide panel behind the rear liquid crystal display;

disposing at least one light source configured to provide lighting to the rear light guide panel, and securing at least the front light guide frame, front liquid crystal panel assembly, the rear liquid crystal panel assembly, and the rear light guide panel in a fixed relation relative to one another in a housing, wherein external lateral dimensions of the rear liquid crystal panel assembly are less than corresponding external lateral dimensions of the front liquid crystal panel assembly, and wherein the multi-layer display is configured to provide a first video layer on the front liquid crystal panel assembly and to provide a second video layer on the rear liquid crystal panel assembly.

13. The method of assembling a multi-layer display for a wagering game device according to claim 12, wherein the rear liquid crystal panel has external lateral dimensions equal to that of corresponding interior lateral dimensions of the front light guide frame.

14. The method of assembling a multi-layer display for a wagering game device according to claim 13, wherein the rear liquid crystal panel is disposed within and substantially co-planar with the opening of the front light guide frame.

15. The method of assembling a multi-layer display for a wagering game device according to claim 12, wherein the rear liquid crystal panel has external lateral dimensions larger than that of corresponding interior lateral dimensions of the front light guide frame.

16. The method of assembling a multi-layer display for a wagering game device according to claim 12, wherein the at least one light source configured to provide lighting to the front light guide frame comprises opposing edge light sources.

17. The method of assembling a multi-layer display for a wagering game device according to claim 16, wherein the at least one light source configured to provide lighting to the front light guide panel comprises at least one of cold-cathode fluorescent lamps, or light emitting diodes.

18. The method of assembling a multi-layer display for a wagering game device according to claim 12, wherein the at least one rear source configured to provide lighting to the rear light guide panel comprises at least one of cold-cathode fluorescent lamps edge light sources, or light emitting diodes.

19. The method of assembling a multi-layer display for a wagering game device according to claim 12, wherein a luminosity of the rear light guide panel and light source combination is greater than a luminosity of the front light guide frame and light source combination.

20. The method of assembling a multi-layer display for a wagering game device according to claim 12, wherein a single layer video image displayed on the front liquid crystal panel assembly is backlit, in combination, by the rear light guide panel and light source combination and the front light guide frame and light source combination.

* * * * *